No. 775,546. Patented November 22, 1904.

UNITED STATES PATENT OFFICE.

EDWARD J. SHEEHAN, OF UTICA, NEW YORK, ASSIGNOR TO SAN GABRIEL VALLEY ESSENTIAL OIL COMPANY, OF PASADENA, CALIFORNIA, A CORPORATION OF CALIFORNIA.

OLEO-RESINOUS PRODUCT FROM CITRUS FRUITS.

SPECIFICATION forming part of Letters Patent No. 775,546, dated November 22, 1904.

Application filed October 19, 1901. Serial No. 79,289. (Specimens.)

*To all whom it may concern:*

Be it known that I, EDWARD J. SHEEHAN, a citizen of the United States, residing at 21 Rutger street, Utica, in the county of Oneida and State of New York, have invented a new and useful Improved Oleo-Resinous Product from Citrus Fruits, of which the following is a specification.

My invention relates to oleo-resinous products obtained from the fresh peel of oranges and lemons in the class of citrus fruits. The utility and value of these essential oils reside in the contained flavoring constituents. The best of the known processes produce oils which while they contain the terpenes and aldehydes substantially the same as in mine are lacking to any appreciable extent and perhaps altogether in the solid neutral resins which heretofore have not been known to be present and certainly have never been extracted and which I have discovered to be not only constituents, but the further fact that they, with the acid resins, go to supplement the flavoring power of the citral or other fundamental flavoring principle of the oil.

My invention therefore consists of a new product, an oleo-resin derived from the peel of citrus fruits, comprising oranges and lemons, and which consists not alone of the essential oil proper composed, as known, of the terpenes and aldehydes, but of a constituent flavoring-resin composed of acid resins, some of which are known, and of heretofore unknown neutral resins in the form of solid compounds in large quantity proportionately to the oil contained in the oil-cells of the peel. My new product therefore is a true oleo-resin, identifiable by the characteristics hereinafter more fully stated, and it possesses a decided aromatic power and flavor, so much so as to closely simulate that of the ripe fresh fruit itself.

I will now describe my new product whereby it may be identified and distinguished from prior essential oils in this class. This will best be done by describing its physical characteristics and its constituents as determined by analysis first as derived from orange-peel and then as derived from lemon-peel.

1. Concrete oleo-resin of orange: It is of a clear reddish color and possesses a peculiarly agreeable and persistent odor of the ripe orange. Its specific gravity at 15° centigrade is 0.8567; optical rotation, 88.46°; optical rotation of first ten per cent. of distillate, 90°. Of citral and aldehydes it contained 1.28 per cent., of terpenes, 88.36 per cent., and of resins, both acid and neutral, 10.36 per cent. The terpene constituent boiled at 175° centigrade under normal pressure. With fifteen inches mercury-pressure it was distilled as follows: began at 145° centigrade; ten per cent. at 147° centigrade; twenty, thirty, forty, and fifty per cent. at 149° centigrade; and sixty, seventy, and seventy-five per cent. at 150° centigrade. The resin constituent treated with eighty-five per cent. and also with ninety-five per cent. alcohol and also with alcoholic potash, both hot and cold in each case, disclosed it to be made up largely of one or more varieties of solid neutral resins and a series of fragrant acid resins, the two classes being in about equal proportions, and that they form a series was determined by the fact that on separation by the alcohol and alkali treatment described the residual portions were in one case liquid, in another waxy, and a third one solid, but all about equally fragrant and bitter to the taste. The contained solid neutral resins precipitated from hot eighty-five per cent. alcohol take a crystalline form on cooling and melt at 127° to 130° centigrade.

2. Concrete oleo-resin of lemon: It is of a greenish yellow color and possesses to a high degree the peculiar bitter and aromatic fragrance of the ripe fruit. Its specific gravity at 15° centigrade is 0.864; optical rotation, 52.75°; optical rotation of first ten per cent. of distillate, 54.25°. Of citral it contained 6.83 per cent., of terpenes 84.70 per cent., and of resins, both acid and neutral, 8.61 per cent. The terpene constituent boiled under normal pressure at 172° plus centigrade and distilled under fifteen inches mercury-pressure as follows: beginning at 140° centigrade, ten per cent. at 143°, increasing up to eighty per cent. at 159° centigrade. The resin constituent, like that from the orange-peel, consists of about equal parts of mixed resin acids, to which no one formula (such as given in the *National Dispensatory*, $C_{20}H_{30}O_8$) can be given, and a class of neutral resins solid and not distillable with steam. The acids obtained showed, with like solvents, as in case of the orange oleoresin, the same gradation of properties stated, only to a greater extent. The solid neutral resins were precipitated from hot eighty-five-per-cent. alcohol in crystalline form and melted at 120° plus centigrade.

The chief distinguishing and differentiating characteristic of my new product and by which it may be identified is the concrete resinous constituent composed in about equal parts of acid resins of the character described and of a class of solid neutral resins of the character stated. Aside from that, the concrete product, it will be observed, shows a slightly higher specific gravity than the expressed essential oils of commerce from the class of citrus fruits and a lower optical rotation, (normal, ninety-four degrees for orange-oil and fifty-nine degrees to sixty-four degrees for lemon-oil.) The latter fact is consistent with and corroborative of the presence of a large percentage of resins—acid and neutral solids—the latter being heavier resins with no optical activity.

My new product has also in each case a deeper color than the lemon and orange oils of commerce obtained by either expression or steam distillation. This peculiarity does not, however, give it any special advantage. I mention it merely as a feature which serves to some extent to identify my product on casual inspection. Its chief distinguishing feature is that on analysis I have found it to contain not only acid resins, but neutral solid resins, each class in about equal parts, the total resin constituent, being the characteristic flavoring-resin, amounting to as much as eight per cent. plus in the lemon-oil and ten per cent. plus in the orange-oil, reckoned on the weight taken of the new oleo-resin product. The presence of this comparatively large proportion of flavoring-resin constituent modifies in a very notable degree the odor and flavor of the terpenes and aldehydes contained in and characteristic of the essential oil contained in the peel of citrus fruits, such as oranges and lemons, and goes so far to both modify and supplement the flavoring power of the citral or other flavoring principle of the oily constituent as to make my oleo-resin product an essentially-different product from the corresponding essential oils of commerce not only in constituent elements, optical rotation, and shade of color, but in aromatic power and flavor.

The quantity of the aforesaid resin constituent in my new product will vary slightly from the percentages given, according to the quality and condition of the fruit used. It is soft and waxy in consistency and of bitter taste, characteristic, however, in that regard of the particular fruit—orange or lemon—in each case. It is completely soluble in ether, chloroform, carbon disulfid, as well as in light petroleum ether, but only partially soluble in strong alcohol, (from one-third to one-half.) The portion thereof which is insoluble in alcohol is an acid product and will be dissolved in an alcoholic solution of caustic soda. From the solutions so obtained crystalline precipitates analogous to or identical with limettin (Tilden & Bock. *Jour. Chem. Soc.* 1890, p. 323) are obtained on adding an excess of hydrochloric acid. Well diluted my new product gives off a very fragrant odor of the fresh fruit, simulating it very closely.

Having thus described my invention, what I claim as new, and desire to secure by Letters Patent, is—

The new oleo-resinous product described, which is obtained from the peel of orange and lemon, in the class of citrus fruits, and consisting, in addition to the known terpenes and aldehydes composing in great part the contained essential oil in the fruit, of a constituent series of flavoring-resins, composed of acid resins and neutral resins in nearly equal proportions, the aggregate quantity varying from six to ten per cent. of the total product; its specific gravity is slightly higher and its optical rotation slightly lower, than the essential oils of commerce; in color it is a greenish yellow for the lemon, and clear reddish for the orange product; it has the aromatic fragrance of the ripe fruit; its constituent neutral resins are not distillable with steam, but precipitate from hot alcohol in crystalline form and melt at 120° to 130° centigrade; its constituent acid resins are not soluble in strong alcohol, but are soluble in an alcoholic solution of caustic soda; and its resinous constituent as a whole, is completely soluble in ether, chloroform and carbon disulfid.

In testimony whereof I affix my signature in presence of two witnesses.

EDWARD J. SHEEHAN.

Witnesses:
 W. N. MORTON,
 J. DE P. LYNCH.